(12) United States Patent
Dobbie

(10) Patent No.: US 8,760,759 B1
(45) Date of Patent: Jun. 24, 2014

(54) SYSTEM AND METHOD FOR BINARY FOCUS IN NIGHT VISION DEVICES

(75) Inventor: Blair Reuben Dobbie, Roanoke, VA (US)

(73) Assignee: Exelis, Inc., McLeans, VA (US)

( * ) Notice: Subject to any disclaimer, the term of this patent is extended or adjusted under 35 U.S.C. 154(b) by 1353 days.

(21) Appl. No.: 12/538,310

(22) Filed: Aug. 10, 2009

(51) Int. Cl.
  *G02B 23/00* (2006.01)
  *G02B 7/28* (2006.01)

(52) U.S. Cl.
  CPC ... *G02B 7/287* (2013.01); *G02B 7/28* (2013.01); *G02B 23/00* (2013.01)
  USPC ............................. 359/425; 359/399; 359/410

(58) Field of Classification Search
  CPC .......... G02B 7/28; G02B 7/282; G02B 7/287; G02B 23/00; G02B 23/2484
  USPC .................................. 359/399–426, 693–706
  See application file for complete search history.

(56) References Cited

U.S. PATENT DOCUMENTS

| | | | | |
|---|---|---|---|---|
| 4,807,985 | A * | 2/1989 | Feinbloom | 351/158 |
| 6,992,275 | B1 | 1/2006 | Knapp | |
| 7,018,040 | B2 | 3/2006 | Blum et al. | |
| 7,269,920 | B2 | 9/2007 | Staley, III | |
| 7,382,353 | B2 * | 6/2008 | Grady et al. | 345/156 |
| 2006/0121993 | A1 * | 6/2006 | Scales et al. | 463/48 |
| 2008/0218436 | A1 | 9/2008 | Lipscomb | |

FOREIGN PATENT DOCUMENTS

| | | |
|---|---|---|
| EP | 1947501 A2 | 7/2008 |
| JP | 7092395 | 4/1995 |

OTHER PUBLICATIONS

Invitation to Pay Additional Fees issued in PCT/US2010/043473 filed Jul. 28, 2010, mailed Apr. 29, 2011.
International Search Report for PCT/US2010/043473 filed Jul. 28, 2010, mailed Jul. 4, 2011.
Written Opinion for PCT/US2010/043473 filed Jul. 28, 2010, mailed Jul. 4, 2011.

* cited by examiner

*Primary Examiner* — Thong Nguyen
(74) *Attorney, Agent, or Firm* — RatnerPrestia

(57) ABSTRACT

Focusing devices and methods for controlling a focal position of an objective lens assembly in a night vision optical device are provided. The focusing device includes an objective lens assembly positioned at a first or second focus position from an imaging device and a binary focus controller, coupled to the objective lens assembly, configured to translate the objective lens assembly relative to the imaging device to either the first or second focus position. The objective lens assembly is translated to either the first or second focus position in response to an orientation of the night vision optical device.

11 Claims, 16 Drawing Sheets

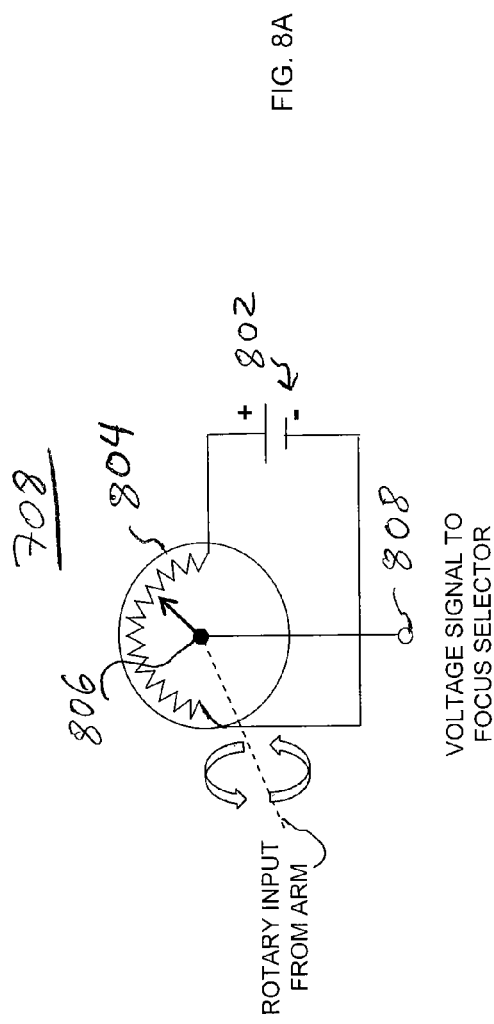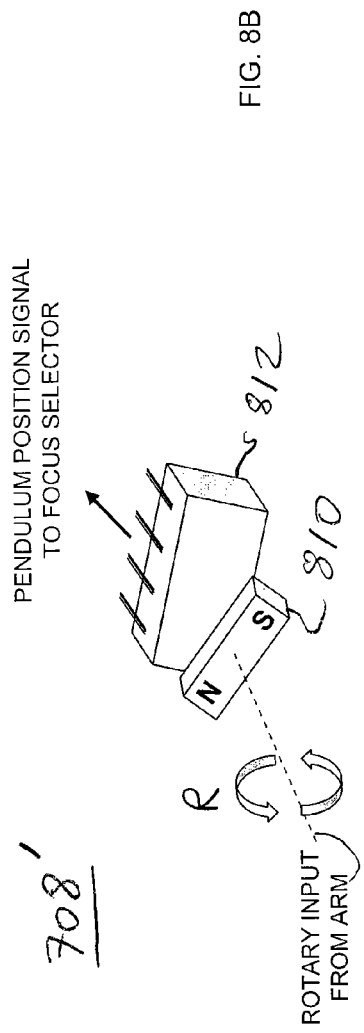

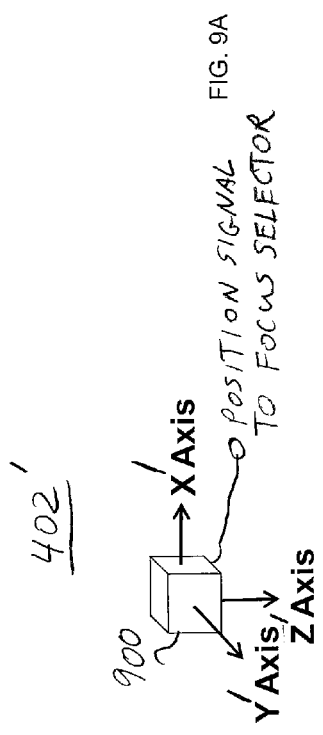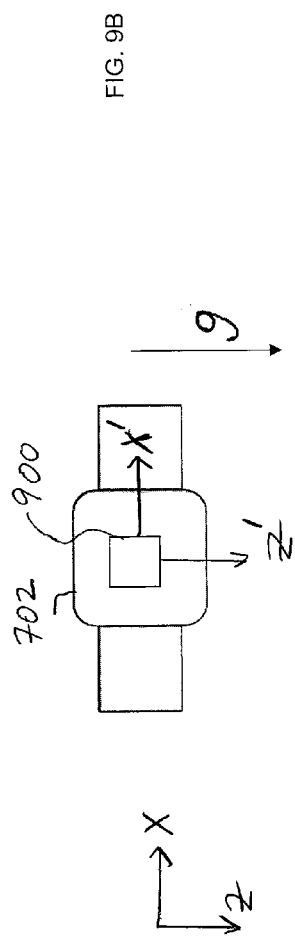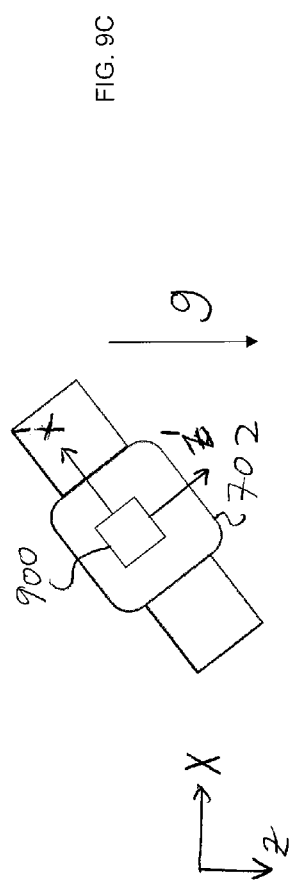

SYSTEM AND METHOD FOR BINARY FOCUS IN NIGHT VISION DEVICES

FIELD OF INVENTION

The present invention relates to a binary focus mechanism for use with an optical device, particularly suited for night vision goggle applications.

BACKGROUND OF THE INVENTION

Night vision systems are used in a wide variety of military, industrial and residential applications to enable sight in a dark environment. For example, night vision systems are utilized by military aviators during nighttime flights or military soldiers patrolling the ground. As another example, security cameras use night vision systems to monitor dark areas.

Conventional image intensified night vision equipment utilize an image intensifier ($I^2$) to amplify a low light level (LL) scene. The image intensifier collects tiny amounts of light in a dark environment, including the lower portion of the infrared light spectrum, that are present in the environment but may be imperceptible to the human eye. The image intensifier amplifies the light so that the human eye can perceive the image. The light output from the image intensifier can either be supplied to a camera or directly to the eyes of the viewer. Image intensifier devices are commonly used in night vision goggles, i.e., a monocular or binocular, that are worn on a user's head for transmission of light output directly to the viewer.

Night vision systems typically do not include an autofocus device. Conventional autofocus devices include an objective lens, an electronic imaging device (such as a charge coupled device (CCD) or complementary metal oxide semiconductor (CMOS) circuit), an electro-mechanical driver for positioning the objective lens relative to the imaging device and an electronic processor that performs real-time image analysis. In operation, the electronic processor determines a suitable focus adjustment based on the real-time image analysis. The electronic processor sends focus commands to the electro-mechanical driver to position the objective lens for optimal focusing of the image.

Because the processor is continually analyzing the image, and may adjust the objective lens over a wide range of focus positions, continuous electrical power is generally used by the autofocus components. In a conventional application, the power provided to the autofocus components may represent a significant percentage of the available power. For applications that are carried by an individual and are battery operated, the total operating time from a single battery charge may be strongly influenced by the power consumption by the autofocus device. In addition, the weight of existing autofocus devices, in particular, the weight of the electro-mechanical driver and battery components, tends to reduce the mobility of the observer.

SUMMARY OF THE INVENTION

The present invention relates to a focusing device for use with a night vision optical device. The focusing device includes an objective lens assembly positioned at a first or second focus position from an imaging device and a binary focus controller, coupled to the objective lens assembly, configured to translate the objective lens assembly relative to the imaging device to either the first or second focus position. The objective lens assembly is translated to either the first or second focus position in response to an orientation of the night vision optical device.

The present invention also relates to a night vision optical device. The night vision optical device includes an objective lens assembly positioned at a first or second focus position from an imaging device and a binary focus controller, coupled to the objective lens assembly. The binary focus controller includes a line of sight (LOS) sensor coupled to the night vision optical device, configured to detect an orientation of the night vision optical device relative to a horizontal LOS and a focus selector for selecting either the first or second focus position in response to the detected orientation of the night vision optical device. The binary focus controller is configured to translate the objective lens assembly relative to the imaging device to either the first or second focus position responsive to the focus selector.

The present invention also relates to a method for controlling a focal position of an objective lens assembly positioned from an imaging device in a night vision optical device. The method includes detecting an orientation of the night vision optical device relative to a horizontal line of sight (LOS), selecting either a first or second focus position in response to the detected orientation of the night vision optical device and translating the objective lens assembly relative to the imaging device to the selected focus position.

BRIEF DESCRIPTION OF THE DRAWINGS

The invention may be understood from the following detailed description when read in connection with the accompanying drawing. Included in the drawing are the following figures:

FIG. 8A is a circuit diagram of a tilt angle detector included in the LOS sensor shown in FIG. 7A, according to an exemplary embodiment of the present invention;

FIG. 8B is a perspective diagram of a tilt angle detector in the LOS sensor shown in FIG. 7A, according to another exemplary embodiment of the present invention;

FIG. 9A is a perspective diagram of a line of sight (LOS) sensor included in the binary focus controller shown in FIG. 4, according to another exemplary embodiment of the present invention;

FIGS. 9B and 9C are side view diagrams of the LOS sensor shown in FIG. 9A coupled to a night vision optical device, illustrating examples of sensor orientation relative to an orientation of a night vision optical device for far and near focus positions, respectively, according to exemplary embodiments of the present invention;

DETAILED DESCRIPTION OF THE INVENTION

The invention will next be illustrated with reference to the figures. Such figures are intended to be illustrative rather than limiting and are included herewith to facilitate explanation of the present invention. The figures are not to scale, and are not intended to serve as engineering drawings.

Figure 1:
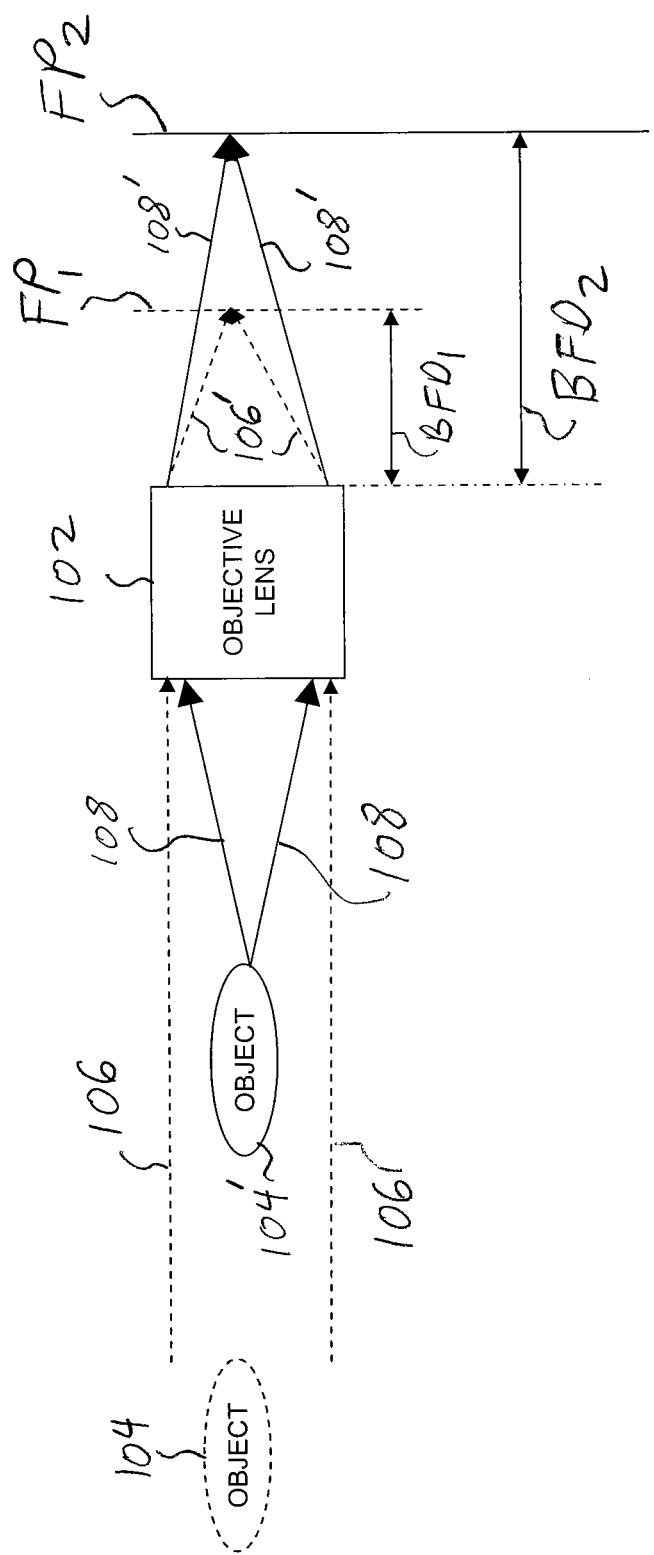
FIG. 1 is a block diagram illustrating a position of a focal plane relative to an objective lens for objects at different distances from the objective lens.

Referring to FIG. 1, a block diagram illustrating a position of a focal plane (FP) $FP_1$ (or $FP_2$) relative to objective lens 102 for object 104 (or object 104') at different distances from the objective lens. Objective lens 102 represents a general objective lens, and may include one or more optical lens elements. In general, objective lens 102 passes light rays 106 (or light rays 108) from object 104 (or object 104') and produces light rays 106' (or light rays 108') that converge onto $FP_1$ (or $FP_2$). The focal plane represents the position of the focused image of an object. Typically, the focal plane represents the position of an imaging device (not shown), such as a CCD detector, a CMOS detector, or an image intensifier.

In FIG. 1 two different conditions for focusing are illustrated. A first condition corresponds to object 104 located far from objective lens 102. Object 104 is illustrated as being located far enough away from objective lens 102 to be considered to be at optical infinity. Light rays 106 from object 104 are generally parallel light rays as they reach objective lens 102. Light rays 106 pass through objective lens 102 to form light rays 106' that converge at $FP_1$. The $FP_1$ is located at a back focus distance (BFD) of $BFD_1$.

A second condition corresponds to object 104' located near objective lens 102. Object 104' is illustrated as being relatively close to objective lens 102 (i.e., not at infinity) to produce light rays 108 that diverge as they reach objective lens 102. Light rays 108 pass through objective lens 102 to form light rays 108' that converge at $FP_2$. The $FP_2$ is located at $BFD_2$. It may be appreciated that the first focal plane $FP_1$ is closer to objective lens 102 as compared with the second focal plane $FP_2$ and that objects 104, 104' are brought to focus at different back focus distances $BFD_1$, $BFD_2$ in the image space of objective lens 102.

Figure 2:
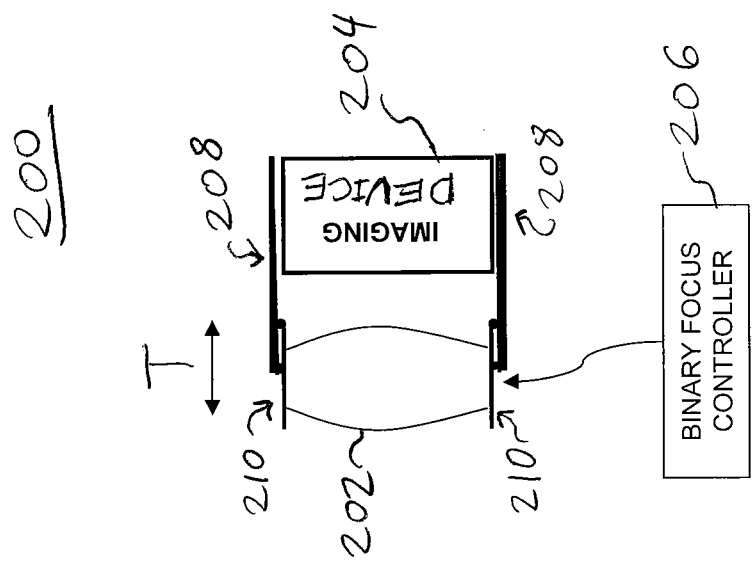
FIG. 2 is a cross-section diagram of a focusing device according to an exemplary embodiment of the present invention.

Referring next to FIG. 2, there is shown a focusing device for providing binary focusing, generally designated as 200. Focusing device 200 may be used in a night vision optical device, such as night vision optical device 300 (shown in FIG. 3A). Focusing device 200 includes objective lens assembly 202, imaging device 204, and binary focus controller 206. Imaging device 204 is coupled to housing 208. Objective lens assembly 202 is mounted to lens translation mechanism 210 that is also coupled to the housing. Thus, the objective lens assembly 202 translates along translation direction T relative to imaging device 204 via lens translation mechanism 210.

In operation, binary focus controller 206 determines an orientation of a night vision optical device (such as night vision optical device 300 (FIG. 3A)) and translates objective lens assembly 202 relative to imaging device 204 to one of two discrete focus positions.

In general, objective lens assembly 202 may include one or several optical power elements, such as lens elements and/or mirrors, that are at fixed positions relative to each other within the overall objective lens assembly. Thus, lens translation mechanism 210 is illustrated as translating the entire objective lens assembly 202 relative to imaging device 204. According to another exemplary embodiment, objective lens assembly 202 may include one or more optical power elements that move relative to other optical power elements, in order to adjust the back focal distance to imaging device 204. In this embodiment, lens translation mechanism 210 may translate one or several optical power elements relative to other optical power elements within objective lens assembly 202, in order to provide the binary focusing described further below.

Imaging device 204 may include any suitable device for obtaining an image of an object, such as a CCD detector, a CMOS detector or an image intensifier. Lens translation mechanism 210 may be any suitable mechanism, such as a carriage to translate objective lens assembly 202 relative to imaging device 204. Binary focus controller 206 is described further below with respect to FIG. 4.

Figure 3A:
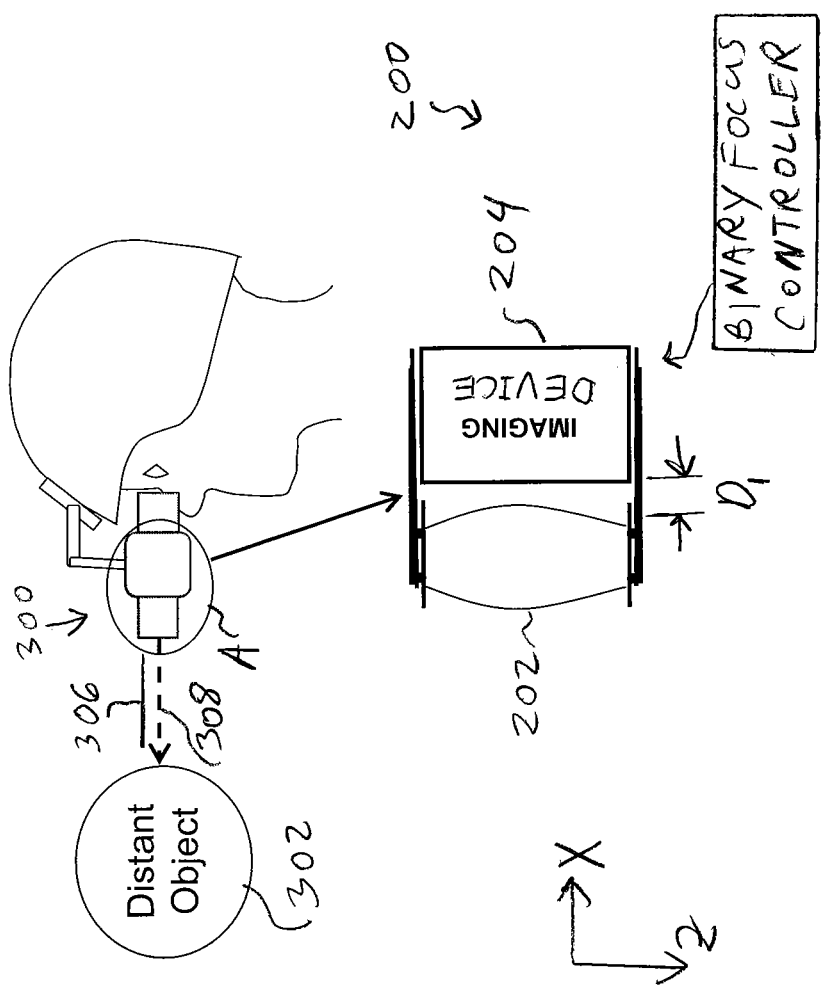
FIGS. 3A and 3B are cross-section diagrams of the focusing device shown in FIG. 2 as part of a night vision optical device, illustrating binary positioning of the objective lens assembly for distant and near objects, respectively, according to exemplary embodiments of the present invention.
Figure 3B:
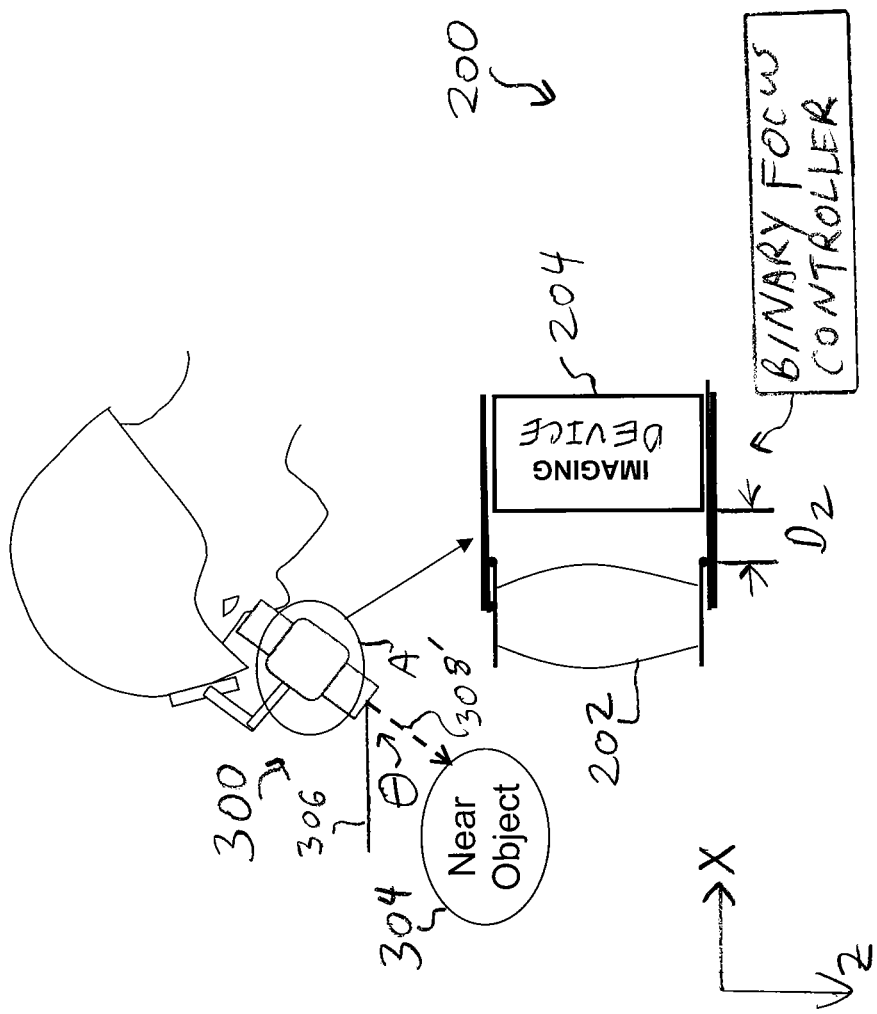

Referring next to FIGS. 3A and 3B, cross-section diagrams of focusing device 200 are shown as being a section A of night vision optical device 300. In particular, FIG. 3A shows the positioning of objective lens assembly 202 for distant object 302 (at back focal distance $D_1$); and FIG. 3B illustrates positioning of objective lens assembly 202 for near object 304 (at back focal distance $D_2$).

In FIG. 3A, night vision optical device 300 is directed toward distant object 302 with a line of sight (LOS) that is substantially parallel to a horizontal direction 306 (i.e., night vision optical device 300 has a horizontal LOS 308 in an X,Y,Z Cartesian Coordinate System (Y is into the page)). In this case, objective lens assembly 202 is positioned at distance $D_1$ relative to imaging device 204. The distance $D_1$ represents the first focus, position (i.e. a far focus position) for objective lens assembly 202.

In FIG. 3B, night vision optical device 300 is oriented at LOS 308' that is directed to near object 304. The LOS 308', thus, orients night vision optical device 300 at a tilt angle θ relative to horizontal direction 306. In this case, objective lens assembly 202 is positioned at distance $D_2$ relative to imaging device 204. The distance $D_2$ represents a second focus position (i.e. a near focus position) of objective lens assembly 202. In this case, it is assumed that the tilt angle θ is greater than a threshold angle (described further below), such that objective lens assembly is positioned at the near focus position.

According to the present invention, the first and second focus positions are automatically determined by binary focus controller 206, based on the orientation of night vision optical device 300. Accordingly, the first focus position may be selected by binary focus controller 206 when the tilt angle θ is detected to be less than or equal to the predetermined threshold. The second focus position may be selected by binary focus controller 206 when the tilt angle θ is greater than the predetermined threshold. Thus, the present invention has a line of sight sensor that automatically drives objective lens assembly 202 to a near focus position when the LOS is above a predetermined threshold.

In a typical scenario, the user/viewer may want an infinity focus when looking along a horizontal LOS at far objects. The infinity focus position of conventional autofocus devices typically allows for clear viewing of far targets and scenes and supports a general mobility task. If the soldier needs to observe a near obstacle, (such as a log or a ditch during movement), however, it is not convenient or feasible to repeatedly manually adjust the focus of the conventional focusing device between a near and far position. In those cases, the soldier typically leaves the focus of conventional focus devices in the far focus position and gets a highly defocused image of the near obstacle when the night vision optical device is momentarily aimed down at the area in front of his feet. In general, a near focus of about five feet (about 1.524 m) (object distance) is typically used in order to support maneuvering around and through obstacles.

The present invention provides two automatically determined, pre-set objective lens focus positions for a soldier. The present invention automatically selects the first or second focus position, without requiring the soldier to remove his hands from a weapon to adjust the focus. The binary focusing of the present invention may be useful for a dismounted soldier for both viewing of far targets and scenes and for maneuvering around near obstacles.

Figure 4:
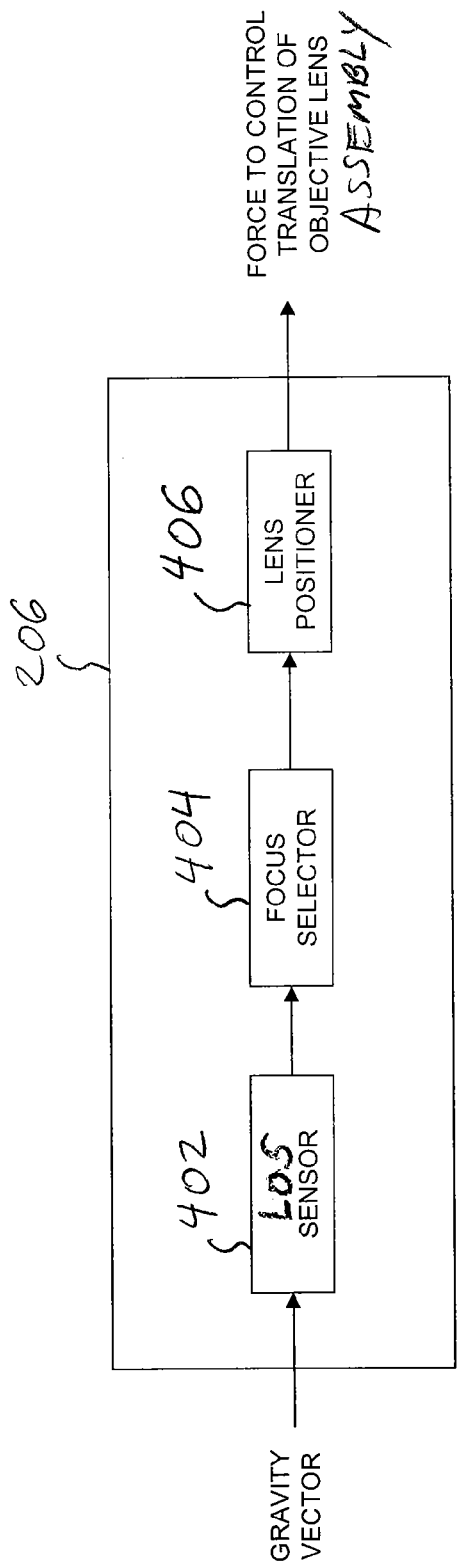
FIG. 4 is a block diagram of a binary focus controller included in the focusing device shown in FIG. 2, according to an exemplary embodiment of the present invention.

Referring to FIG. 4, an exemplary binary focus controller 206 is shown. Binary focus controller 206 includes LOS sensor 402, focus selector 404 and lens positioner 406. In general LOS sensor 402 uses the Earth's gravity vector to determine the orientation of night vision optical device 300 (FIG. 3A). Different example embodiments of LOS sensor 402 are described further below with respect to FIGS. 7-9. As described with respect to FIGS. 7-9, LOS sensor 402 may include electrical and/or mechanical components.

Focus selector 404 receives tilt angle information from LOS sensor 402, determines the tilt angle θ from the tilt angle information. Focus selector 404 selects either the first or second focus positions based on the instantaneous tilt angle θ. It is understood that focus selector 404 may include an electronic processor and/or mechanical components. An example focus selector 404 that includes pneumatic components is described further below with respect to FIGS. 11A and 11B. Focus selector 404 provides the selected focus position setting to lens positioner 406 (for example, as a focus command).

Lens positioner 406 receives the focus position setting (for example, a focus command) from focus selector 404 and provides a force to control translation of objective lens, via lens translation mechanism 210 (FIG. 2). An example of lens positioner 406 is described further below with respect to FIGS. 10A and 10B. Another exemplary embodiment of binary focus controller 206 is described further below with respect to FIGS. 11A and 11B. It is understood that lens positioner 406 may include electrical and/or mechanical components to translate objective lens assembly 202 (FIG. 2).

Figure 5A:
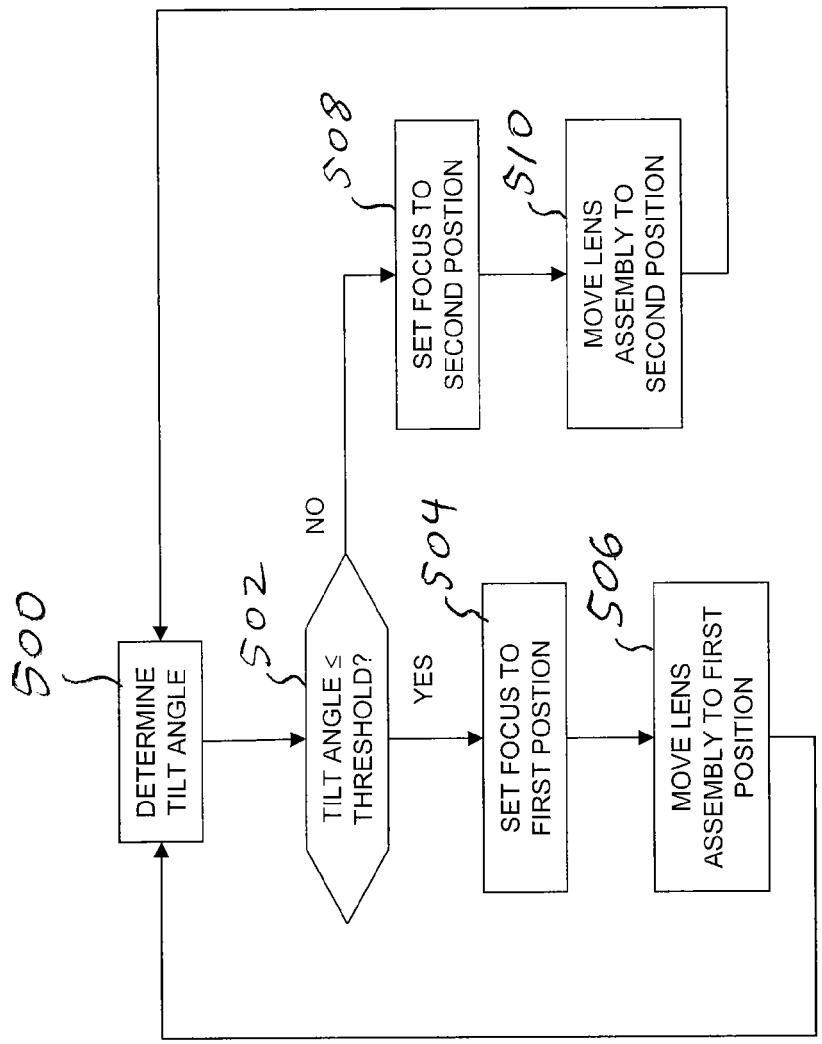
FIGS. 5A and 5B are flow charts illustrating exemplary methods of binary positioning of an objective lens assembly, according to embodiments of the present invention.
Figure 5B:
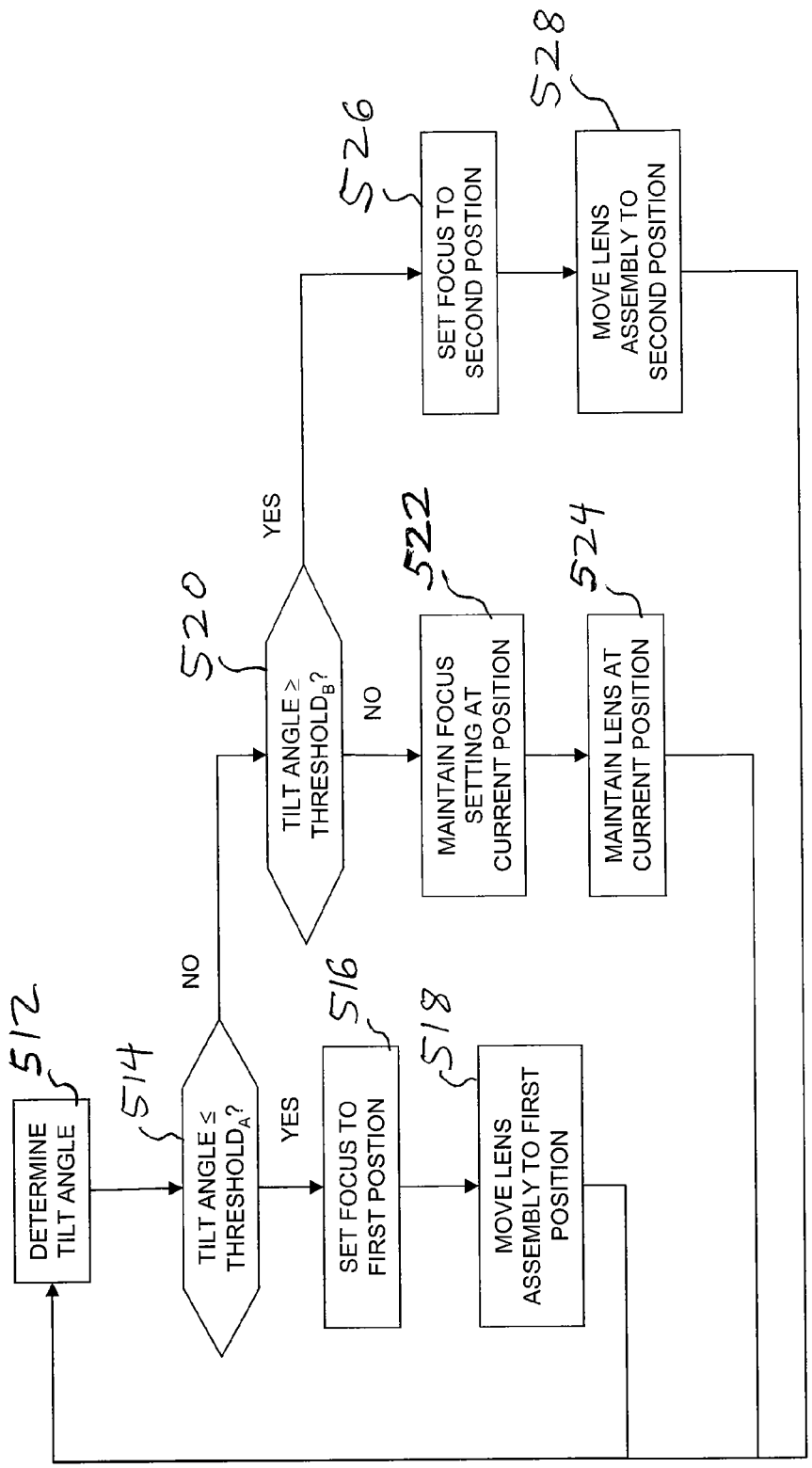

Referring next to FIGS. 5A and 5B, exemplary methods for translating the objective lens assembly 202 (FIG. 2) relative to imaging device 204 to discrete binary focus positions are shown. In particular, FIG. 5A represents an exemplary embodiment for selecting a focus position based on a single threshold; and FIG. 5B represents another exemplary embodiment for selecting a focus position based on two thresholds (threshold$_A$, threshold$_B$), thus implementing a hysteresis function.

Referring to FIG. 5A, at Step 500, a tilt angle θ is determined, for example, based on tilt angle information received from LOS sensor 402. At Step 502, it is determined whether the tilt angle θ is less than or equal to a threshold. Although in an exemplary embodiment, the threshold is 40° below horizontal plane 306 (FIG. 3B), it is understood that the threshold may be any suitable threshold for separating near and far focusing conditions for the user.

If the tilt angle θ is less than or equal to the threshold, Step 502 proceeds to Step 504. At Step 504, the focus is set to the first focus position (i.e., the far position shown in FIG. 3A), for example by focus selector 404 (FIG. 4). For example, a focus command may be generated by focus selector 404 (FIG. 4) indicating the first focus position. At Step 506, objective lens assembly 202 (FIG. 3A) is translated to the first focus position (at distance $D_1$), for example, responsive to the focus command, by lens positioner 406 in conjunction with lens translation mechanism 210 (FIG. 2). Step 506 proceeds to Step 500.

If the tilt angle θ is greater than the threshold, Step 502 proceeds to Step 508. At Step 508, the focus is set to the second focus position (i.e., the near focus position shown in FIG. 3B), for example, by focus selector 404 (FIG. 4). For example, a focus command may be generated by focus selector 404 (FIG. 4) indicating the second focus position. At Step 510, objective lens assembly 202 is translated to the second focus position (at distance $D_2$ shown in FIG. 3B), for example, responsive to the focus command, by lens positioner 406 (FIG. 4) in conjunction with lens translation mechanism 210 (FIG. 2). Step 510 proceeds to Step 500. The process of Steps 500-510 may be continued for updated tilt angle information.

Referring to FIG. 5B, at Step 512, the tilt angle θ is determined, for example, using the tilt angle information received from LOS sensor 402. At Step 514, it is determined whether the tilt angle θ is less than or equal to a first threshold threshold$_A$. Although in an exemplary embodiment, the threshold$_A$ is 40° below horizontal plane 306 (FIG. 3B), it is understood that the first threshold may be any suitable threshold for separating near and far focusing conditions for the user.

If it is determined that the tilt angle θ is less or equal to threshold$_A$, Step 514 proceeds to Step 516. At Step 516, the focus is set to the first focus position (i.e., the far position shown in FIG. 3A), for example, by focus selector 404 (FIG. 4). At Step 518, objective lens assembly 202 (FIG. 3A) is translated to the first focus position (at distance $D_1$), for example by lens positioner 406 (FIG. 4) in conjunction with lens translation mechanism 210 (FIG. 2). Step 518 proceeds to Step 512.

If it is determined that the tilt angle θ is greater than threshold$_A$, Step 514 proceeds to Step 520. At Step 520, it is determined whether the tilt angle θ is greater than or equal to a second threshold, threshold$_B$. An exemplary embodiment, threshold$_B$ represents 45° below horizontal plane 306 (FIG. 3B). Although in an exemplary embodiment, the threshold$_B$ is 45° below horizontal plane 306 (FIG. 3B), it is understood that the second threshold may be any suitable threshold for providing a borderline region separating near and far focusing conditions for the user.

If the tilt angle θ is greater than or equal to threshold$_B$, Step 520 proceeds to Step 526. At Step 526, the focus is set to the second focus position (i.e., the near position shown in FIG. 3B), for example, by focus selector 404 (FIG. 4). At Step 528, objective lens assembly 202 (FIG. 3B) is translated to second focus position (at distance $D_2$), for example, by lens positioner 406 (FIG. 4) in conjunction with lens translation mechanism 210 (FIG. 2). Step 528 proceeds to Step 512.

If it is determined, at Step 520, that the tilt angle θ is less than threshold$_B$ (and greater than threshold$_A$, Step 514) Step 520 proceeds to Step 522. At Step 522, the focus setting is maintained at its current focus position, for example, by focus selector 404 (FIG. 4). At Step 524, the objective lens assembly 202 is maintained at its current position (either at the first focus position or the second focus position). Step 524 proceeds to Step 512.

Steps 520, 522 and 524 represents a hysteresis function that uses the previously determined focus position for conditions where the tilt angle θ is between threshold$_A$ and threshold$_B$. In this embodiment, the use of two thresholds, threshold$_A$, threshold$_B$ may prevent repeated switching between the near and far lens positions when the LOS 308' (FIG. 3B) is in a borderline orientation between threshold$_A$ and threshold$_B$.

Steps 512, 514, 516, 518, 520, 522, 524, 526 and 528 may be repeated for each detected tilt angle, for example, indefinitely.

Figure 6A:
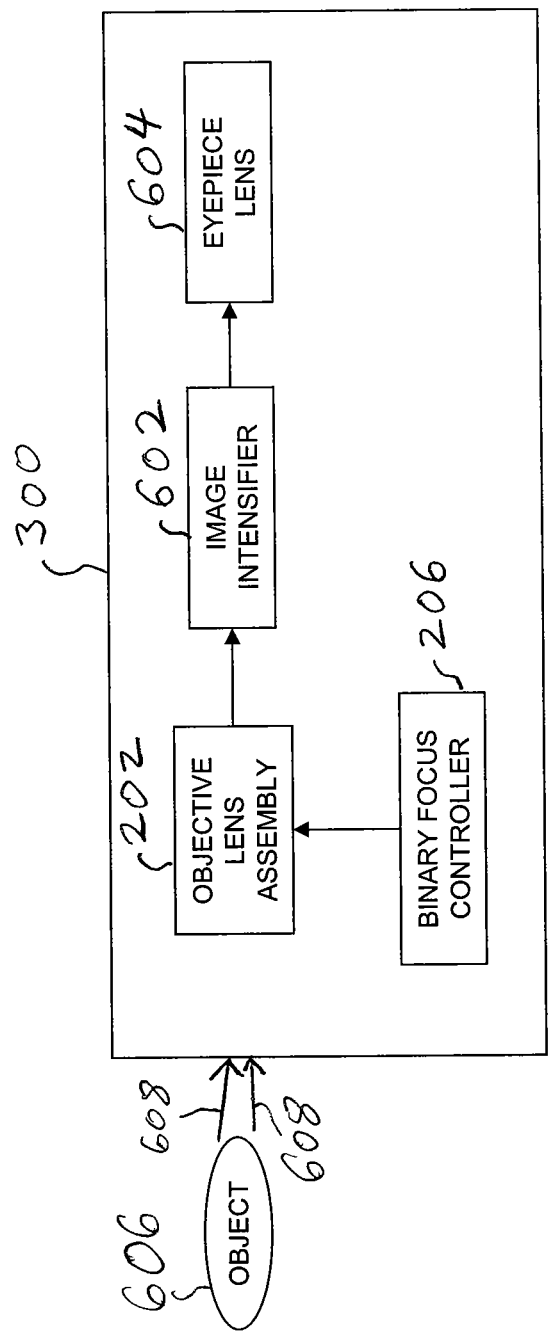
FIG. 6A is a block diagram of a night vision optical device, according to an exemplary embodiment of the present invention.

Referring next to FIG. 6A, a block diagram of an exemplary night vision optical device 300 is shown. Night vision optical device 300 includes objective lens assembly 202, binary focus controller 206, image intensifier 602 and eyepiece lens 604. Night vision optical device 300 may include other components, such as a high voltage power supply (HVPS).

Objective lens assembly 202 is positioned by binary focus controller 206 to receives light rays 608 from object 606 for a first or second focus position. Objective lens assembly 202 provides a focused image of a low light level scene to image intensifier 602, which may be powered by a HVPS. Image intensifier 602 amplifies the faint image at its input and reproduces a brighter version of this image on its output surface. This image is coherently transmitted to eyepiece lens 604 for display of the produced image. In FIG. 6A, imaging device 204 is represented by image intensifier 602.

Figure 6B:
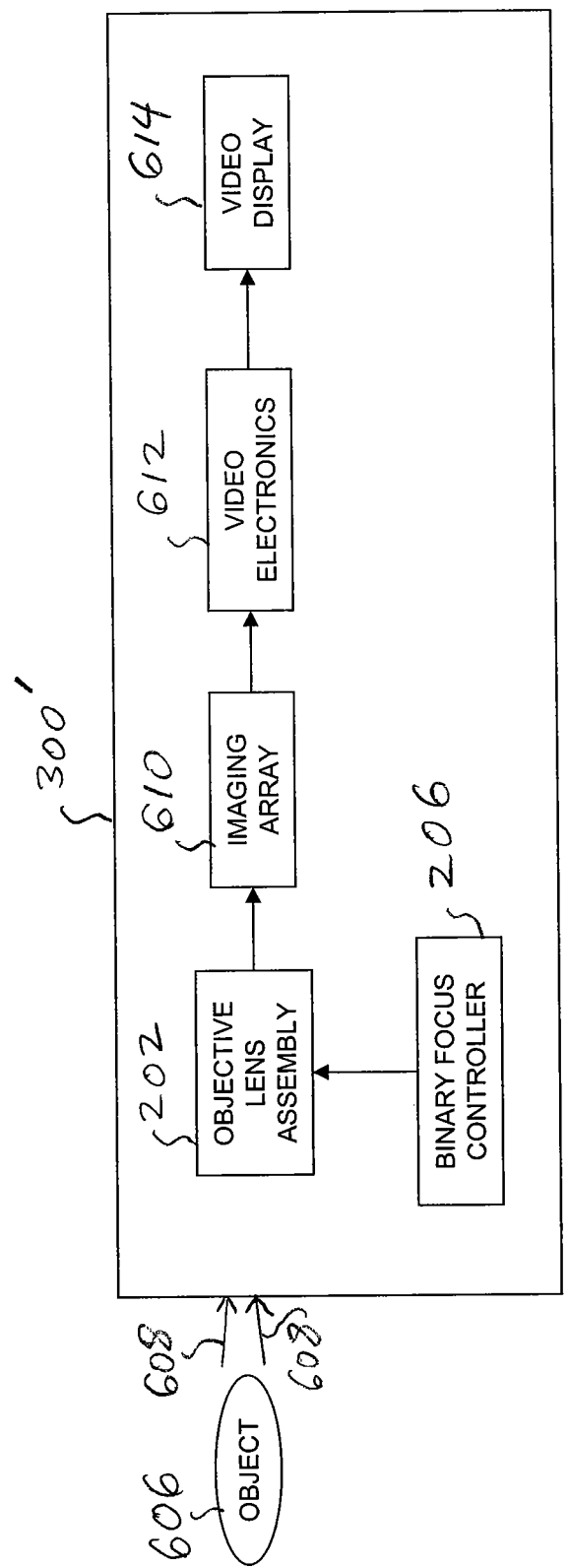
FIG. 6B is a block diagram of a night vision optical device, according to another exemplary embodiment of the present invention.

Referring next to FIG. 6B, a block diagram of another exemplary night vision optical device 300' is shown. Night vision optical device 300' includes objective lens assembly 202, binary focus controller 206, imaging array 610, video electronics module 612 and video display 614. Night vision optical device 300' is similar to or functionally equivalent to night vision optical device 300, except that device 300' includes imaging array 610 for generating an image of object 606. In addition, device 300' includes video electronics module 612 and video display 614 for producing a real time video image of object 606.

Objective lens assembly 202 is positioned by binary focus controller 206 to receives light rays 608 from object 606 for a first or second focus position. Objective lens assembly 202 provides a focused image of a low light level scene to imaging array 610 for video applications. In FIG. 6B, imaging device 204 is represented by imaging array 610. Imaging array 610, which may be, for example, of a CMOS or CCD type, senses the focused image and creates real time video data that contains a rendition of the image. The video data is provided to video electronics module 612 for converting the video data from imaging array 610 into digital video data. Video display 614 receives that digital video data and displays the real time digital video image.

Figure 7A:
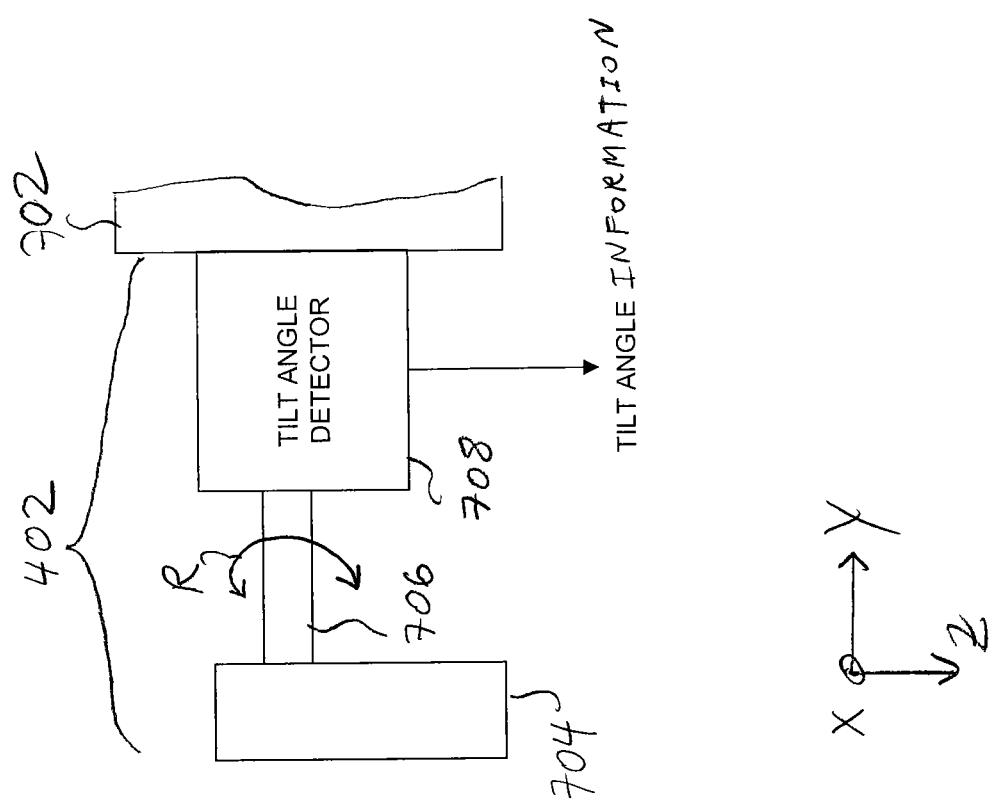
FIG. 7A is a cross-section diagram of a line of sight (LOS) sensor included in the binary focus controller shown in FIG. 4, according to an exemplary embodiment of the present invention.
Figure 7B:
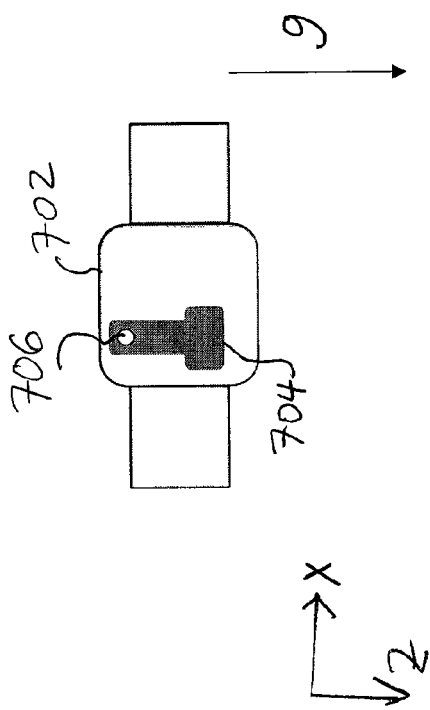
FIGS. 7B and 7C are side view diagrams of the LOS sensor shown in FIG. 7A, illustrating examples of sensor orientation relative to an orientation of a night vision optical device for far and near focus positions, respectively, according to exemplary embodiments of the present invention.
Figure 7C:
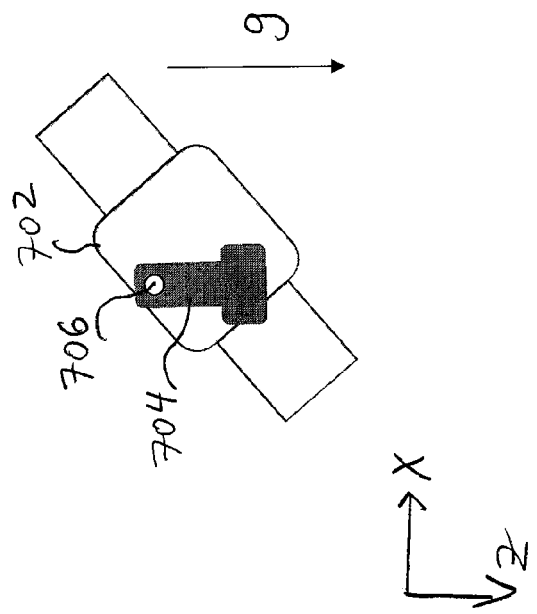

Referring next to FIGS. 7A-7C, an exemplary LOS sensor 402 is shown. In particular, FIG. 7A is a cross-section diagram of LOS sensor 402 coupled to a body 702 of night vision optical device 300 (FIG. 3A); FIG. 7B is a side view diagram of LOS sensor 402 for a far focus condition; and FIG. 7C is a side view diagram of LOS sensor 402 for a near focus condition.

In FIGS. 7A-7C, LOS sensor 402 includes a pendulum mass 704 rigidly coupled to pendulum arm 706. Pendulum arm 706 is also coupled to tilt angle detector 708. In addition, tilt angle detector 708 is coupled to body 702 of night vision optical device 300 (FIG. 3A). Pendulum mass 704 is coupled to body 702 such that pendulum mass 704 is maintained in a position corresponding to the gravity vector g.

As can be seen in FIGS. 7B and 7C, during movement of body 702 relative to the horizontal plane (i.e. the plane of X and Y), the position of pendulum mass 704 is maintained in a direction of gravity vector g. At the same time, the movement of body 702 causes rotation of pendulum arm 706 in rotation direction R relative to the Y axis. Tilt angle detector 708 detects the rotation of pendulum arm 706 and provides tilt angle information. The tilt angle information may be provided to focus selector 404 (FIG. 4). Thus, the pendulum arm 706 rotation provides the tilt angle information.

Referring next to FIGS. 8A and 8B, exemplary tilt angle detectors 708, 708' for use with LOS sensor 402 (FIG. 7A) are shown. In particular, FIG. 8A is a circuit diagram of a tilt angle detector 708; and FIG. 8B is a perspective diagram of another tilt angle detector 708'.

In FIG. 8A, tilt angle detector 708 includes a potentiometer 804, voltage supply 802 and output terminal 808 coupled to potentiometer 804. Pendulum arm 706 is coupled to a wiper 806 of potentiometer 804. Thus, rotation of pendulum arm 706 varies the wiper position and the resulting voltage produced at output terminal 808. The voltage signal at output terminal 808 may be provided to focus selector 404 (FIG. 4). Focus selector 404 may convert the voltage signal to a tilt angle, for example, by a digital look-up table. It is understood that focus selector 404 may be implemented using any suitable digital and/or analog electronics.

Referring to FIG. 8B, tilt angle detector 708' may include a magnetic rotational sensor including magnet 810 and magnetic rotary position encoding circuit 812. Pendulum arm 706 may be coupled to magnet 810. Rotation R of pendulum arm 706 may produce a pendulum position signal via encoding circuit 812. The pendulum position signal may be provided to focus selector 404, which may convert the position signal to a tilt angle, for example via a look-up table. Potentiometers and encoding circuits are known in the art and may be understood by the skilled person. It is understood that tilt angle detectors 708, 708' represent two exemplary embodiments for detecting an orientation of night vision optical device 300 (FIG. 6) relative to the horizontal direction 306 (FIG. 3A) and that other suitable tilt angle detectors may be used.

Referring now to FIGS. 9A-9C, another exemplary LOS sensor 402' is shown. In particular, FIG. 9A is a perspective diagram of a three-axis accelerometer 900 that is used as LOS sensor 402'. FIGS. 9B and 9C are examples illustrating the orientation of accelerometer 900 with respect to gravity vector g at far and near focus conditions, respectively.

Accelerometer 900 may be any suitable Micro-Electro-Mechanical system (MEMS) that may collect data along three axes X', Y' and Z' to detect gravity vector g. As shown in FIGS. 9B and 9C, accelerometer 900 is coupled to body 702 of night vision optical system 300 (FIG. 3A). Although not shown, accelerometer 900 may include other components, such as a preamplifier and/or filters having suitable filter coefficients to detect the gravity vector g. Accelerometer 900 provides a position signal (including X', Y' and Z' axis data) to focus selector 404 (FIG. 4), which represents the tilt angle information.

For example, as shown in FIG. 9B, body 702 is oriented to the far focus position (i.e., having a horizontal LOS). When body 702 is moved to the far focus position, only the Z' axis data may contribute to the position signal. Accordingly, accelerometer 900 may produce: X' axis data of 0 m/s$^2$, Y' axis data of 0 m/s$^2$ and a Z' axis data of 9.8 m/s$^2$.

Referring to FIG. 9C, when body 702 is moved from the far focus condition (FIG. 9B) to the near focus condition, acceleration data from the Z' axis, as well the acceleration data from the X' axis and/or Y' axis may contribute to the position signal. For example, accelerometer 900 may produce: X' axis data of 6.93 m/s$^2$, Z' axis data of 6.93 m/s$^2$ and Y' axis of 0 m/s$^2$. The acceleration data produced by the X', Y' and Z' axes may be used to determine the tilt angle.

Figure 10A:
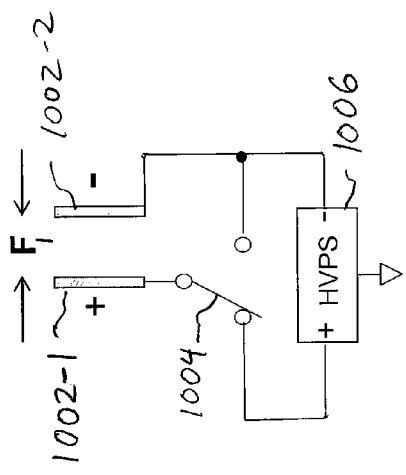
FIGS. 10A and 10B are circuit diagrams of a lens positioner included in the binary focus controller shown in FIG. 4, according to exemplary embodiments of the present invention.
Figure 10B:
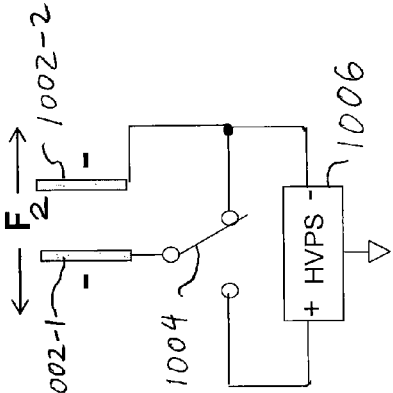

Referring next to FIGS. 10A and 10B, circuit diagrams of exemplary lens positioner 406 for translating objective lens assembly 202 (FIG. 2) based on electrostatic charge is shown. In particular, FIG. 10A illustrates the circuit diagram to produce the far focus position translation; and FIG. 10B illustrates the circuit diagram to produce near focus position translation.

Lens positioner 406 includes electrically charged plates 1002-1 and 1002-2 that are respectively coupled to lens translation mechanism 210 (FIG. 2) and housing 208. Plates 1002 are provided with the same or opposite charges in order to produce a force $F_1$ or $F_2$ to translate objective lens assembly 202 (FIGS. 3A, 3B) to respective back focus distances $D_1$, $D_2$. In order to apply the appropriate charge to plates 1002, lens positioner 406 includes HVPS 1006 and switch 1004. The position of switch 1004 may be set based on focus selector 404 (FIG. 4). It is understood that an appropriate force $F_1$, $F_2$ may be determined to translate objective lens assembly 202 (FIGS. 3A, 3B) based on the desired back focal distances $D_1$, $D_2$.

As shown in FIG. 10A, switch 1004 is set to a first position, causing plates 1002-1 and 1002-2 to be oppositely charged. Because plates 1002 are oppositely charged, they are attracted to each other, causing an attraction force $F_1$. The attraction force $F_1$ causes objective lens assembly 202 (FIG. 3A) to move to distance $D_1$.

As shown in FIG. 10B, switch 1004 is set to a second position, causing plates 1002-1 and 1002-2 to have a same charge (e.g., a negative charge). Because plates 1002 have a same charge, they are repelled from each other, causing an repelling force $F_2$. The repelling force $F_2$ causes objective lens assembly 202 (FIG. 3B) to move to distance $D_2$.

In an exemplary embodiment, HVPS 1006 may receive an input voltage of 3 V DC (with 10-15 mA) and produce an output voltage of 4-5 kV (with 10-15 nA). It is understood that any suitable power supply may be used to generate the appropriate force F to translate objective lens assembly 202 (FIGS. 3A, 3B) to the appropriate first and second focus positions (i.e., to back focal distances $D_1$, $D_2$).

Figure 11A:
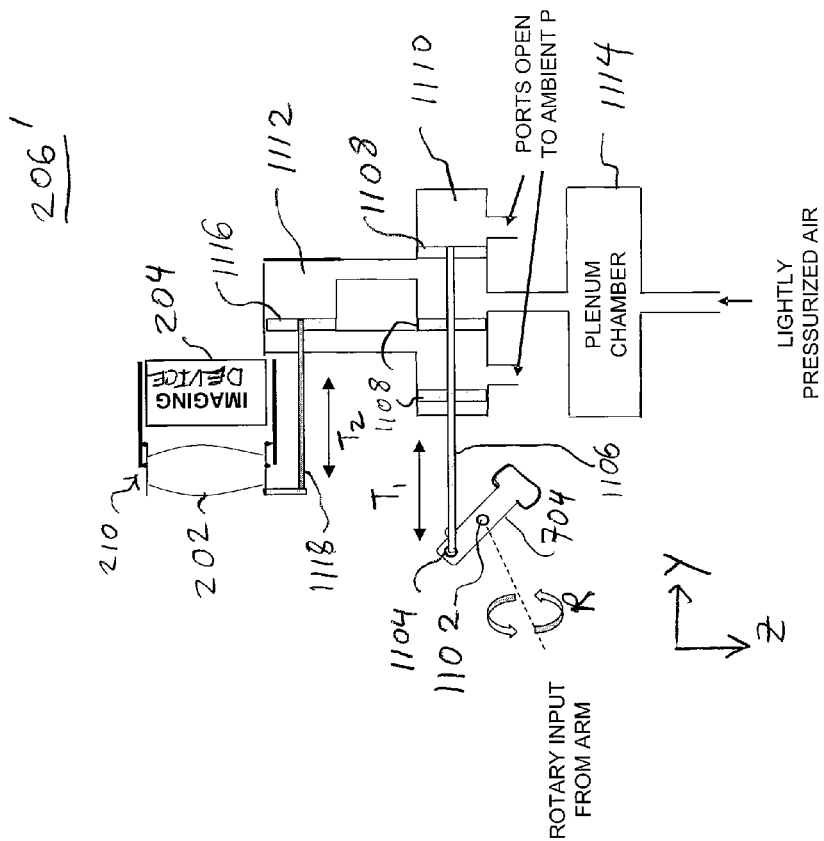
FIGS. 11A and 11B are cross-sectional diagrams of the binary focus controller shown in FIG. 4, according to another exemplary embodiment of the present invention.
Figure 11B:
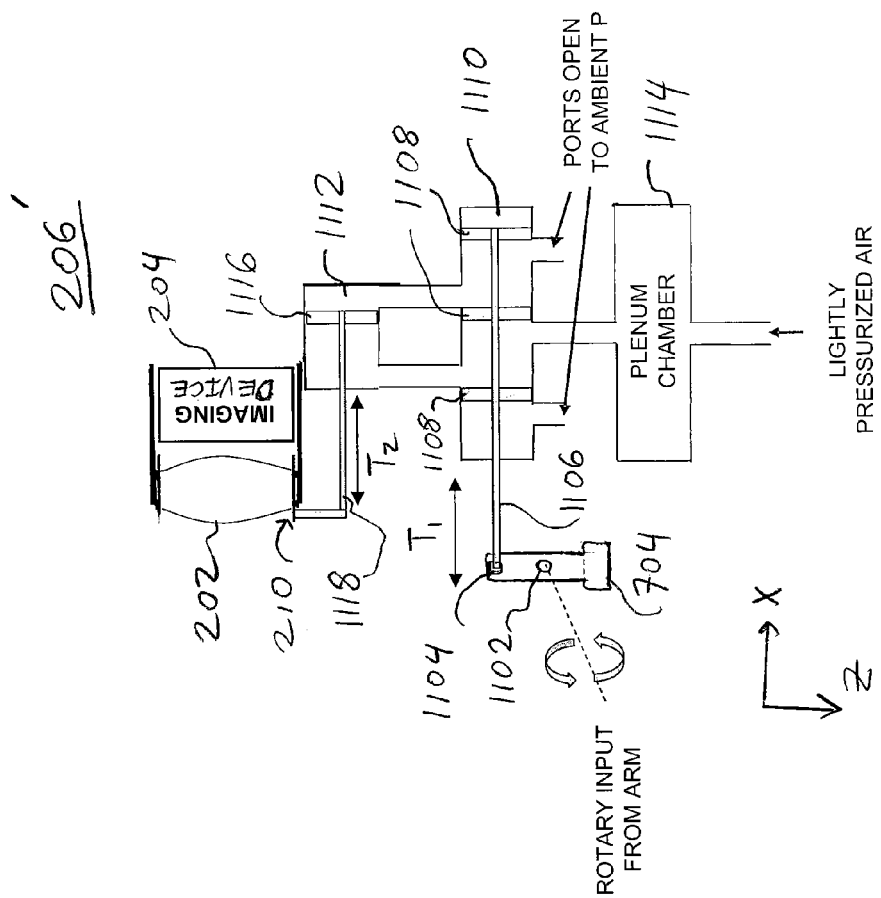

Referring next to FIGS. 11A and 11B, a pneumatically based binary focus controller 206' is shown. In particular, FIG. 11A is a cross-section diagram of binary focus controller 206' for providing the near focus position (i.e., back focus distance $D_2$ shown in FIG. 3B); and FIG. 11B is a cross-section diagram of binary focus controller 206' for providing the far focus position (i.e., back focus distance $D_1$ shown in FIG. 3A).

Binary focus controller 206' includes pendulum mass 704 that is coupled to a pendulum arm at pivot point 1102. Because pendulum mass 704 is also coupled to linkage 1106 at pivot point 1104, pendulum mass 704 provides translation of linkage 1106 in the $T_1$ direction in response to movement of a night vision optical device 300 (FIG. 3A). Linkage 1106 is coupled to first piston 1108 positioned in first cylinder 1110 (i.e. a first pneumatic system). A second linkage 1118 is coupled to second piston 1116 that is positioned in a second cylinder 1112 (i.e. a second pneumatic system). First cylinder 1110 and second cylinder 1112 are pneumatically coupled to each other (i.e., second cylinder 1112 is slave to first cylinder 1110). Linkage 1118 is also coupled to lens translation mechanism 210.

Binary focus controller 206' also includes plenum chamber 1114 which receives and stores lightly pressurized air, for example, from a wearable pump (not shown) and which is coupled to first air cylinder 1110. Air cylinder 1110 includes ports open to ambient pressure (P).

Linkage 1106 represents a tilt angle detector (such as tilt angle detector 708 (FIG. 7A)). Linkage 1118, piston 1116 and second air cylinder 1112 represents a lens positioner (such as lens positioner 406 (FIG. 6)). First piston 1108 and first air cylinder 1110 represent a focus selector (such as focus selector 404 (FIG. 4)).

In operation, the rotation of pendulum mass 704 drives first piston 1108 to one of two positions in response to the tilt angle θ. When first piston 1108 changes position, pressurized air from plenum chamber 1114 flows to one side of second piston 1116, thus driving second piston 1116 to an opposite end of second cylinder 1112. First piston 1108 allows air from a decreasing volume side of second cylinder 1112 to reach equilibrium with the local ambient pressure, which provides a pressure differential to move second piston 1116. Thus, movement of pendulum mass 704 causes linear translation $T_1$ of linkage 1106 and also causes translation $T_2$ of linkage 1118. The translation $T_2$ of linkage 1118, in turn, translates objective lens assembly 202 to the near focus position (FIG. 11A) or to the far focus position (FIG. 11B).

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A focusing device for use with a night vision optical device, the focusing device comprising:
   an objective lens assembly positioned at a first or second focus position from an imaging device; and
   a binary focus controller, coupled to the objective lens assembly, configured to translate the objective lens assembly relative to the imaging device to either the first or second focus position,
   wherein the objective lens assembly is translated to either the first or second focus position in response to an orientation of the night vision optical device,
   the binary focus controller includes a line of sight (LOS) sensor coupled to the night vision optical device, the LOS sensor configured to determine a tilt angle of the night vision optical device relative to a horizontal LOS, the tilt angle corresponding to the orientation of the night vision optical device,
   the LOS sensor includes a pendulum mass coupled to the night vision optical device via a pendulum arm, the pendulum arm rotating responsive to the orientation of the night vision optical device, wherein the tilt angle is determined based on a rotation of the pendulum arm, and
   a tilt angle detector including:
   a potentiometer having first and second terminals coupled to a voltage source, a wiper of the potentiometer coupled to the pendulum arm and an output terminal, wherein an output voltage at the output terminal is varied due to rotation of the wiper coupled to the pendulum arm, and the tilt angle is determined based on the output voltage.

2. A focusing device according to claim 1, wherein the first focus position is associated with an object positioned far from the objective lens assembly and the second focus position is associated with the object positioned substantially closer to the objective lens assembly.

3. A focusing device according to claim 1, wherein the LOS sensor includes an accelerometer coupled to the night vision optical device.

4. A night vision optical device comprising:

an objective lens assembly positioned at a first or second focus position from an imaging device; and a binary focus controller, coupled to the objective lens assembly including:

a line of sight (LOS) sensor coupled to the night vision optical device, configured to detect an orientation of the night vision optical device relative to a horizontal LOS, and a focus selector for selecting either the first or second focus position in response to the detected orientation of the night vision optical device, wherein the binary focus controller is configured to translate the objective lens assembly relative to the imaging device to either the first or second focus position responsive to the focus selector, the LOS sensor includes a pendulum mass coupled to the night vision optical device via a pendulum arm, the pendulum arm rotating with the pendulum mass responsive to the orientation of the night vision optical device, and the LOS sensor includes a linkage coupled to the pendulum arm and the focus selector includes:

a first piston coupled to the linkage and positioned in a first pneumatic system at a first or second position based on a rotation of the pendulum mass, and the first or second position of the first piston, respectively, corresponds to the first or second focus position.

5. A night vision device according to claim 4, wherein the imaging device includes an image intensifier or an imaging array.

6. A night vision device according to claim 4, wherein the first focus position is associated with an object positioned far from the objective lens assembly and the second focus position is associated with the object positioned substantially closer to the objective lens assembly.

7. A night vision device according to claim 4, wherein the binary focus controller includes a lens positioner coupled to the objective lens assembly for translating the objective lens assembly responsive to the selected focus position.

8. A night vision device according to claim 4, wherein the LOS sensor includes an accelerometer.

9. A night vision device according to claim 4, further comprising a lens positioner including:

a second pneumatic system coupled to the first pneumatic system, the second pneumatic system including a second piston configured to be at a first or second further position responsive to the corresponding first or second position of the first piston; and a second linkage coupled to the objective lens assembly and to the second piston, configured to translate the objective lens assembly to either the first or second focus position responsive to the first or second further position of the second piston.

10. A method for controlling a focal position of an objective lens assembly positioned from an imaging device in a night vision optical device, the method comprising:

detecting an orientation of the night vision optical device relative to a horizontal line of sight (LOS);

selecting either a first or second focus position in response to the detected orientation of the night vision optical device; and translating the objective lens assembly relative to the imaging device to the selected focus position;

wherein selecting the second focus position includes:

determining a tilt angle of the night vision optical device in response to the detected orientation;

selecting the first focus position when the tilt angle is less than or equal to a first predetermined threshold;

selecting the second focus position when the tilt angle is greater than or equal to a second predetermined threshold, the second predetermined threshold larger than the first predetermined threshold; and maintaining a previously selected focus position when the tilt angle is greater than the first predetermined threshold and less than the second predetermined threshold.

11. The method according to claim 10, wherein selecting the first focus position corresponds to focusing the objective lens to an object positioned far from the objective lens assembly, and selecting the second focus position corresponds to focusing the objective lens to the object positioned substantially closer to the objective lens assembly.

* * * * *